(12) United States Patent
Lim et al.

(10) Patent No.: US 9,843,794 B2
(45) Date of Patent: Dec. 12, 2017

(54) IMAGING SYSTEMS WITH REAL-TIME DIGITAL TESTING CAPABILITIES

(71) Applicant: SEMICONDUCTOR COMPONENTS INDUSTRIES, LLC, Phoenix, AZ (US)

(72) Inventors: Yan Ping Lim, Corvallis, OR (US); Dennis Engelbrecht, Corvallis, OR (US); Raymond Allen Davis, Salem, OR (US); Agustin Hernandez, Albany, OR (US)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 252 days.

(21) Appl. No.: 14/675,877

(22) Filed: Apr. 1, 2015

(65) Prior Publication Data

US 2016/0295205 A1 Oct. 6, 2016

(51) Int. Cl.
*H04N 17/00* (2006.01)

(52) U.S. Cl.
CPC ................... *H04N 17/002* (2013.01)

(58) Field of Classification Search
CPC .............................. H04N 17/002; H04N 17/00
See application file for complete search history.

(56) References Cited

U.S. PATENT DOCUMENTS

| | | | | |
|---|---|---|---|---|
| 5,818,572 A | * | 10/1998 | Pappas | G01M 11/0292 356/124.5 |
| 5,859,920 A | * | 1/1999 | Daly | G06T 1/0028 380/54 |
| 6,411,302 B1 | * | 6/2002 | Chiraz | G06F 3/1431 345/531 |
| 7,400,389 B2 | | 7/2008 | Gomm et al. | |
| 8,350,934 B2 | | 1/2013 | Chao et al. | |
| 8,736,684 B1 | * | 5/2014 | Johansson | H04N 17/002 348/180 |
| 8,803,979 B2 | * | 8/2014 | Solhusvik | H04N 5/378 348/177 |
| 8,953,047 B2 | * | 2/2015 | Martinussen | H04N 17/002 348/175 |
| 2007/0019075 A1 | * | 1/2007 | Gomm | H04N 17/002 348/187 |

(Continued)

*Primary Examiner* — Brian Yenke
*Assistant Examiner* — Sean Haiem
(74) *Attorney, Agent, or Firm* — Treyz Law Group, P.C.; Vineet Dixit; David K. Cole (57) ABSTRACT

An imaging system with real-time digital testing capabilities verifies the functionality of image processing circuitry used to process pixel data signals read out from a pixel array during imaging operations. Image processing circuitry may process a data frame read from an imaging array that includes multiple regions of imaging and non-imaging data. Digital test patterns may be generated to test the functionality of specific image processing blocks. Test patterns may correspond to or represent imaging data or non-imaging data from regions of the output readout frame. A checksum generator generates a test pattern checksum for output of a subset of the image processing blocks that were provided with a given test pattern. The test pattern checksum may be compared to a predetermined checksum of the output of properly functioning image processing blocks provided with test patterns equivalent to the given test pattern.

15 Claims, 7 Drawing Sheets

(56) References Cited

U.S. PATENT DOCUMENTS

| | | | |
|---|---|---|---|
| 2008/0106602 A1* | 5/2008 | Nussbacher | H04N 17/002 348/187 |
| 2008/0141088 A1* | 6/2008 | Parulkar | G01R 31/318544 714/729 |
| 2008/0144185 A1* | 6/2008 | Wang | G02B 3/14 359/665 |
| 2010/0045824 A1* | 2/2010 | Kido | H04N 5/23293 348/234 |
| 2012/0098975 A1* | 4/2012 | Chao | H04N 5/3572 348/187 |
| 2013/0083204 A1* | 4/2013 | Solhusvik | H04N 5/378 348/187 |
| 2014/0184899 A1* | 7/2014 | McKinley | H04N 5/2253 348/373 |
| 2016/0146888 A1* | 5/2016 | Vooka | G06F 11/27 714/734 |
| 2016/0285626 A1* | 9/2016 | Myers | H04L 9/3247 |

* cited by examiner

IMAGING SYSTEMS WITH REAL-TIME DIGITAL TESTING CAPABILITIES

BACKGROUND

This relates generally to imaging systems, and more particularly, to imaging systems with real time digital testing and verification capabilities.

Electronic devices such as cellular telephones, cameras, and computers often include imaging systems that include digital image sensors for capturing images. Image sensors may be formed having a two-dimensional array of image pixels that convert incident photons (light) into electrical signals. Electronic devices often include displays for displaying captured image data.

An imaging system may include multiple image processing blocks that perform image processing operations on the data that is read out from a digital image sensor. However, conventional imaging systems are unable to test or verify the functionality of the image processing blocks that are used to process data that is read out from a digital image sensor during normal imaging operations.

In a conventional imaging system, the functionality of image processing blocks may tested or verified in an offline mode where imaging operations of the digital image sensor are halted. As a result, such testing or verification of the image processing blocks may occur infrequently, such as after manufacturing and calibration of the device, or only when the camera system is first initialized or turned on.

As camera systems are being used to provide imaging data for use in sensitive applications such as autonomous vehicle control, it is important to verify whether or not image processing blocks are functioning optimally, or as expected, during the operation of the camera system (i.e., by an end user of the camera system).

It would therefore be desirable to be able to provide improved imaging systems with real-time test and verification capabilities.

DETAILED DESCRIPTION

Figure 1:
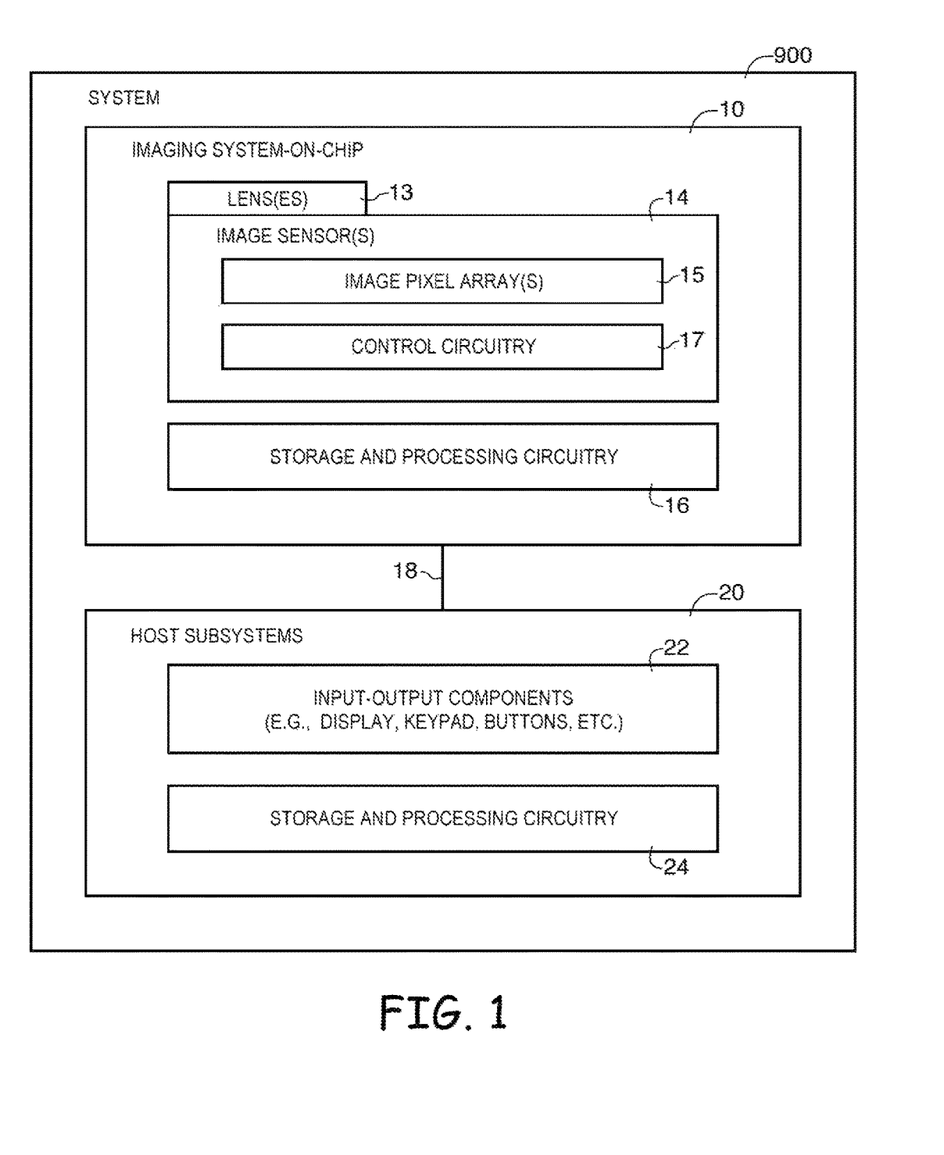
FIG. 1 is a diagram of an illustrative system that includes an imaging system and a host subsystem in accordance with an embodiment of the present invention.

FIG. 1 is a diagram of an illustrative system including an imaging system for capturing images. System 900 of FIG. 1 may be a vehicle safety system (e.g., a rear-view camera or other vehicle safety system), a surveillance system, an electronic device such as a camera, a cellular telephone, a video camera, or any other desired electronic device that captures digital image data.

As shown in FIG. 1, system 900 may include an imaging system such as imaging system 10 and host subsystems such as host subsystem 20. Imaging system 10 may be an imaging system-on-chip that is implemented on a single silicon image sensor integrated circuit die. Imaging system 10 may include one or more image sensors 14 and one or more associated lenses 13. Lenses 13 in imaging system 10 may, as examples, include a single wide angle lens or M*N individual lenses arranged in an M×N array. Individual image sensors 14 may be arranged as a corresponding single image sensor or a corresponding M×N image sensor array (as examples). The values of M and N may each be equal to or greater than one, may each be equal to or greater than two, may exceed 10, or may have any other suitable values.

Each image sensor in imaging system 10 may be identical or there may be different types of image sensors in a given image sensor array integrated circuit. As one example, each image sensor may be a Video Graphics Array (VGA) sensor with a resolution of 480×640 image sensor pixels (as an example). Other arrangements of image sensor pixels may also be used for the image sensors if desired. For example, images sensors with greater than VGA resolution (e.g., high-definition image sensors), less than VGA resolution and/or image sensor arrays in which the image sensors are not all identical may be used.

During image capture operations, each lens 13 may focus light onto an associated image sensor 14. Image sensor 14 may include one or more arrays of photosensitive elements such as image pixel array(s) 15. Photosensitive elements (image pixels) such as photodiodes on arrays 15 may convert the light into electric charge. Image sensor 14 may also include control circuitry 17. Control circuitry 17 may include bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, and other circuitry for operating the image pixels of image pixel array(s) 15 and converting electric charges into digital image data. Control circuitry 17 may include, for example, pixel row control circuitry coupled to arrays 15 via row control lines and column control and readout circuitry coupled to arrays 15 via column readout and control lines. The row control lines may be selectively activated by pixel row control circuitry in response to row address signals provided by row address decoder circuitry in control circuitry 17. Column control lines may be selectively activated by pixel column driver circuitry in response to column address signals provided by column address decoder circuitry in control circuitry 17. Thus, a row and column address may be provided for each pixel, during an online mode of imaging system-on-chip 10.

Still and video image data from imaging system 10 may be provided to storage and processing circuitry 16. Storage and processing circuitry 16 may include volatile and/or nonvolatile memory (e.g., random-access memory, flash memory, etc.). Storage and processing circuitry 16 may include microprocessors, microcontrollers, digital signal processors, application specific integrated circuits, etc.

Image processing circuitry 16 may be used to store image data and perform image processing functions such as data formatting, adjusting white balance and exposure, implementing video image stabilization, face detection, image data write control, image data read control, output image pixel address to input image pixel address transformation, etc. Storage and processing circuitry 16 may include one or more conformal image buffers, a pixel transformation engine, a write control engine, a read control engine, an interpolation engine, a transformation engine, etc.

In one suitable arrangement, which is sometimes referred to as a system-on-chip (SOC) arrangement, image sensor(s) 14 and image processing circuitry 16 are implemented on a common semiconductor substrate (e.g., a common silicon image sensor integrated circuit die). If desired, image sensor (s) 14 and image processing circuitry 16 may be formed on separate semiconductor substrates. For example, sensor 14 and processing circuitry 16 may be formed on separate substrates that are stacked.

Imaging system 10 (e.g., processing circuitry 16) may convey acquired image data to host subsystem 20 over path 18. Host subsystem 20 may include a display for displaying image data captured by imaging system 10. Host subsystem 20 may include processing software for detecting objects in images, detecting motion of objects between image frames, determining distances to objects in images, filtering or otherwise processing images provided by imaging system 10. Host subsystem 20 may include a warning system configured to generate a warning (e.g., a warning light on an automobile dashboard, an audible warning or other warning) in the event objects in captured images are determined to be less than a predetermined distance from a vehicle in scenarios where system 900 is an automotive imaging system.

If desired, system 900 may provide a user with numerous high-level functions. In a computer or advanced cellular telephone, for example, a user may be provided with the ability to run user applications. To implement these functions, host subsystem 20 of system 900 may have input-output devices 22 and storage and processing circuitry 24. Input-output devices 22 may include keypads, input-output ports, joysticks, buttons, displays, etc. Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, etc.

The image pixels of image pixels array(s) 15 may each include a photosensitive element such as photodiode, a positive power supply voltage terminal, a ground voltage terminal and additional circuitry such as reset transistors, source follower transistors, row-select transistors, charge storage nodes, etc. Image pixels in image pixel array(s) 15 may be three-transistor pixels, pin-photodiode pixels with four transistors each, global shutter pixels, time-of-flight pixels, or may have any other suitable photo-conversion architectures.

Figure 2:
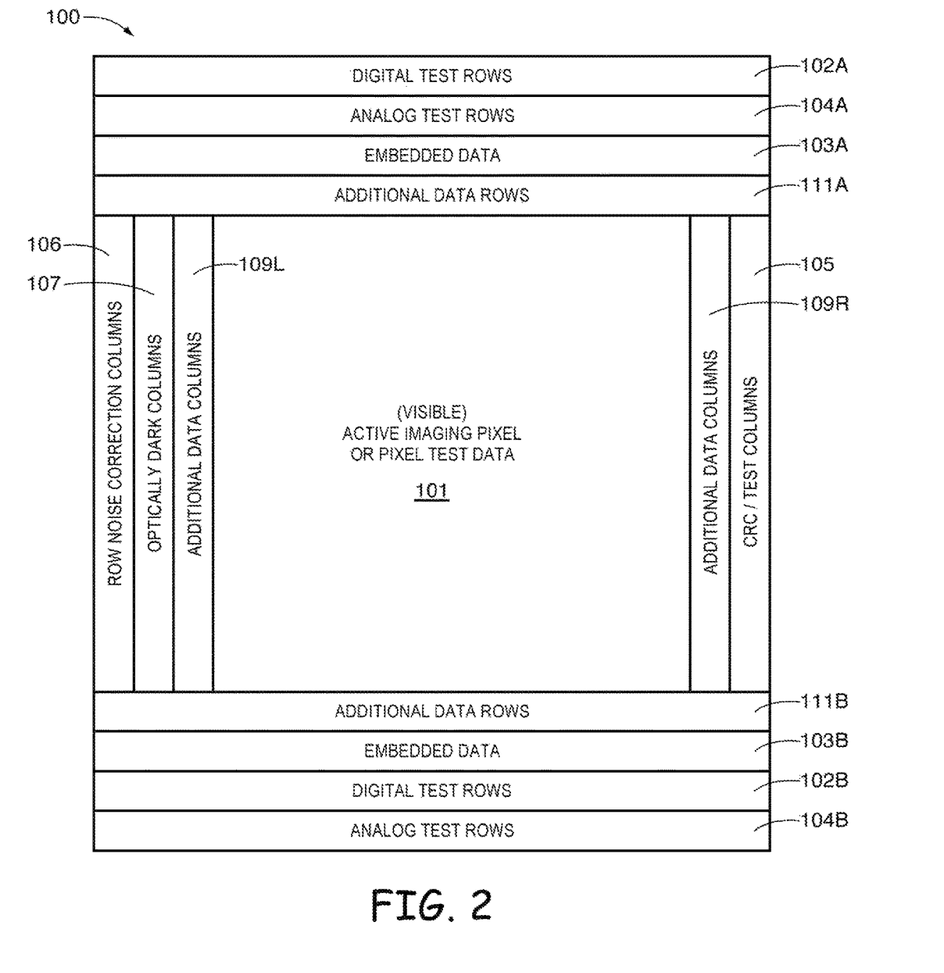
FIG. 2 is a diagram showing an illustrative readout frame that may be generated from an image sensor in accordance with an embodiment of the present invention.

FIG. 2 is a diagram of an illustrative readout frame that may be read out from an image pixel array in accordance with an embodiment of the present invention. As shown in FIG. 2, readout frame 100 may illustrate a temporal view of data that is read out from, and along with, visible pixel data from a given image pixel array 15 in a single frame time. A frame time may be related to the operating frames per second at which an image pixel array 15 is configured to capture images. As an example, if an image pixel array 15 is configured to capture images at 30 frame per second, the frame time for image pixel array 15 may be ⅟₃₀ seconds. Regions illustrated in FIG. 2 in connection with image frame 100 may correspond to physical regions on an image pixel array 15, or may represent data that is produced in a given portion of the frame time of image pixel array 15. Data that is not read out from physical pixels or regions on image pixel array 15 may be appended to data that is read out from physical pixels or regions on image pixel array 15 in a frame readout during a given frame time.

Data corresponding to the various regions of readout frame 100 may be output from top to bottom as shown in FIG. 2. As an example, digital test row data in region 102A may be output or produced before data from embedded data row data in region 103 of the readout frame 100. In the case of digital test row data and embedded data row data in regions 102 and 103, respectively, the data for these regions may not be read out or produced from physical regions on image pixel array 15, but may occupy a portion of the frame time in which the data in readout frame 100 is produced. Data read out in readout frame 100 may be produced or output from control circuitry 17 in FIG. 1. In general, any of the data rows and/or columns illustrated in FIG. 2 may be omitted entirely from readout frame 100. Data rows and/or columns may be omitted from readout frame 100 in response to control signals produced by control circuitry 17 of FIG. 1.

Embedded row data in region 103 may correspond to data that describes the frame being read out. Embedded row data in region 103 may describe the frame being read out by include values stored at various registers, such as in control circuitry 17 that correspond to the settings and parameters used to operate the image sensor 14 during the capture of a particular readout frame 100. Embedded row data may also include register data from other components of the imaging system 10. Embedded row data may also include data that does not correspond directly to any register settings, but that is derived from various operating or performance metrics of the imaging system that describe factors that could influence the quality or characteristics of the readout frame 100. Embedded row data associated with a readout frame 100 may be characterized as invisible data, or meta-data because the embedded data does not correspond to data that contributes to the visible image data but that is still available to users or image processing systems along with the visible image data produced in a frame 100.

As shown in FIG. 2, embedded data may be produced before readout of imaging pixel or pixel test data 101 (in embedded data rows 103A), and may also be produced after readout of imaging pixel or pixel test data 101 (in embedded data rows 103B). In an embodiment, embedded data 103 may be produced only before readout of image pixel data 101, in embedded data rows 103A, and embedded data rows 103B may be omitted from a readout frame 100. In an embodiment, embedded data 103 may be produced only after readout of image pixel data 101, in embedded data rows 103B, and embedded data rows 103A may be omitted from a readout frame 100. In an embodiment, embedded data 103 in rows 103A and 103B may be omitted entirely from a readout frame 100. Embedded data rows 103 may be omitted from readout frame 100 in response to control signals produced by control circuitry 17 of FIG. 1.

Active imaging pixel data 101 in readout frame 100 may correspond to image pixel signals that are read out from the image pixels of image pixel array 15. Optically dark columns 107 may correspond to pixels on the image pixel array 15 that are covered by an optically dark or optically opaque material that prevents light incident on the image pixel array 15 from reaching or electrically influencing the pixels in the optically dark columns. Dark columns 107 may be on one side of the image pixels of image pixel array 15 (as shown in FIG. 2), or on both sides of the image pixels of image pixel array 15. Pixels in dark columns 107 do not receive any light, so the signals generated by dark columns 107 are dark signal dominant. An unmodified signal read out in image pixel data 101 may correspond to a visible light signal as well as a dark signal. A signal based on the pixels in optically dark columns 107 may be subtracted from unmodified signals in image pixel data 101 to produce a signal that is free from dark signal influence. As an example, a value based on the values from a given row of optically dark columns 107 may be subtracted from a respective row of image pixel signals in region 101.

Row noise correction columns 106 may correspond to dark pixels or sensing circuitry on an image pixel array 15 that outputs values corresponding to the values of row noise sources. An unmodified signal read out in image pixel data 101 may correspond to a visible light signal as well as a noise signal. A portion of the noise signal in the unmodified signal read out in image pixel data 101 may be caused by row noise sources. A signal based on the pixels in the row noise correction columns 106 may be subtracted from unmodified signals in image pixel data 101 to produce a signal that is free from row noise. As an example, a value based on the values from a given row of row noise correction columns 106 may be subtracted from a respective row of image pixel signals in region 101.

Data in the rows of CRC/test columns 105 may correspond to invisible data, or meta-data that represents a repeatable cyclic redundancy check value for a corresponding row of imaging pixel data 101, optically dark columns 107, or row noise correction columns 106. In the example of FIG. 2, the rows of CRC columns 105 extend only as far as the rows of imaging pixel data 101. In other suitable arrangements, the rows of CRC columns 105 extend across the entire vertical dimension of the readout frame 100. In this case, CRC values for rows of digital test rows 102, embedded data rows 103, and analog test rows 104 may also be generated. Data in the rows of CRC/test columns 105 may additionally include meta-data from analog circuitry on image sensor 14.

FIG. 2 illustrates additional data columns 109 that includes data that may be produced or included in a readout frame 100 while imaging pixel or pixel test data 101 is read out or produced. Additional data columns 109 may be produced to the left of imaging pixel or pixel test data 101 (in additional data rows 109L), or to the right of imaging pixel or pixel test data 101 (in additional data rows 109R). Any of the data columns or rows illustrated in FIG. 2 may be read out as additional data columns 109. As an example, row noise correction columns 106 may be read out in additional data columns 109L and/or 109R. Similarly, optically dark columns 107 and CRC/test columns 105 may be read out in additional data columns 109L and/or 109R. The order of the readout of the data columns illustrated in FIG. 2 is merely illustrative. In general, any one of the columns 105-107 and 109 may be read out to the right and/or to the left of imaging pixel or pixel test data 101. Any one of the columns 105-107 and 109 may be omitted entirely from a readout frame 100. The columns 105-107 and 109 may be omitted in response to control signals produced by control circuitry 17 of FIG. 1.

Analog test rows 104 may produce data that includes analog test patterns that are read out in readout frame 100. The data in analog test rows 104 may also correspond to meta-data from, or produced by analog circuitry on image sensor 14. As shown in FIG. 2, analog test row data 104 may be produced before readout of imaging pixel or pixel test data 101 (in analog test rows 104A), and may also be produced after readout of imaging pixel or pixel test data 101 (in analog test rows 104B). In an embodiment, analog test row data 104 may be produced only before readout of image pixel data 101, in embedded data rows 104A, and analog test rows 104B may be omitted from a readout frame 100. In an embodiment, analog test row data 104 may be produced only after readout of image pixel data 101, in analog test rows 104B, and analog test rows 104A may be omitted from a readout frame 100. In an embodiment, analog test row data 104 in rows 104A and 104B may be omitted entirely from a readout frame 100. Analog test row data 104 may be omitted from a readout frame 100 in response to control signals produced by control circuitry 17 of FIG. 1.

FIG. 2 also illustrates additional data rows 111 that may correspond to data that is produced or included in a readout frame 100 before imaging pixel or pixel test data 101 is read out or produced (in additional data rows 111A), or after imaging pixel or pixel test data 101 is read out or produced (in additional data rows 111B). Any of the data rows or columns illustrated in FIG. 2 may be read out as additional data rows 111. The order of the data rows that are read out or produced before imaging pixel or pixel test data 101 in FIG. 2 is merely illustrative. If desired, the rows 102A, 103A, and 111A may be read out or produced in any order. As an example, embedded data rows 103A may be produced after additional data rows 111A. Similarly, the order of the data rows that are read out or produced after imaging pixel or pixel test data 101 in FIG. 2 is merely illustrative. If desired, the rows 102B, 103B, 104, and 111B may be read out or produced in any order. As an example, embedded data rows 103B may be produced before additional data rows 111B. Any one of the rows 102-104 and 111 may be omitted entirely from a readout frame 100. Rows 102-104 and 111 may be omitted from a readout frame 100 in response to control signals produced by control circuitry 17 of FIG. 1.

Digital test rows 102 may correspond to data used to test the functionality of read out and processing circuitry used to process readout frame 100. Data from digital test rows 102 may be used to verify that logical or physical processing components (also referred to as processing blocks) are functioning as expected. Digital test row data 102 may be generated once in a given frame time, for example. When digital test row data 102 is generated once in a given frame time, digital test row data 102A may be generated before the image pixel data 101 is read out, or digital test row data 102B may be generated after the image pixel data 101 is read out. Alternatively, digital test row data 102 may be generated twice in a frame time, by generating digital test row data in both region 102A before image pixel data 101 is read out and region 102B after image pixel data 101 is read out.

In certain embodiments of the present invention, digital test row data may be generated for any region of the readout frame 100 to test or verify the functionality of the output processing blocks used to process the data in a given region of readout frame 100. When digital test row data is generated for a given region of the readout frame 100 other than digital test row regions 102, the data sources for the given region may be controlled to be deactivated, or the data read out from the given region may simply be discarded. As an example, if digital test row data is produced for image pixel data region 101 of readout frame 100, the image pixels of image pixel array 15 (FIG. 1) may be deactivated, or operated in a parked, non-imaging mode; alternatively, the image pixels may be operated normally (i.e. in an imaging mode) but the image pixel signals they produce may simply be discarded, not read out, or replaced with digital test row data. In the case of regions of readout frame 100 such as test columns 105, if it is desired to produce test row data for test columns 105, the components of image sensor 14 that generate meta-data from analog circuitry on image sensor 14 may be deactivated; alternatively, the meta-data they produce may be discarded, not read out, or replaced with digital test row data.

Digital test row data produced in regions 102 may correspond to digital patterns that can test the functionality of image processing blocks or components that are used to process other regions of readout frame 100. Image processing blocks or components may refer to physical components or to logical blocks or components in storage and processing circuitry 16 (FIG. 1). In general, digital test row data may be used to determine whether or not imaging system 10 is operating as expected. If digital test row data is generated in a region 102A of readout frame 100 and confirms or verifies the proper or appropriate functionality of imaging system 10 before image pixel data 101 is read out and processed, and if digital test row data is generated in a region 102B of readout frame 100 and confirms or verifies the proper or appropriate functionality of imaging system 10 after image pixel data 101 is read out and processed, system 900 or a user of system 900 may be assured or guaranteed that the image pixel data 101 that was read out was read out and processed accurately (e.g., the integrity of the read out image data may be verified).

Figure 3:
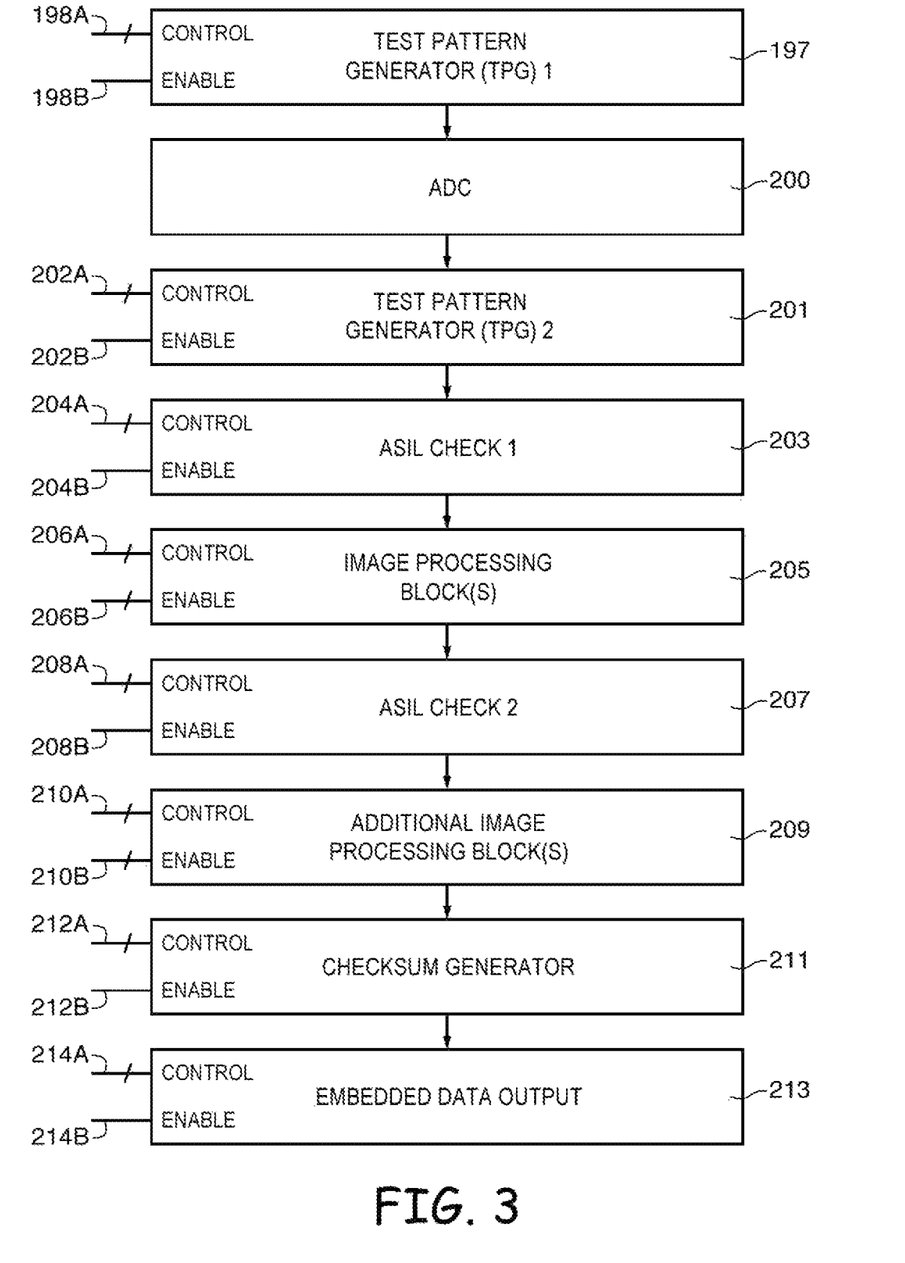
FIG. 3 is diagram showing illustrative image processing blocks that may process data in a readout frame for performing real-time image sensor verification operations in accordance with an embodiment of the present invention.

FIG. 3 is a diagram showing illustrative image processing blocks that may process data in a readout frame such as readout frame 100 of FIG. 2. Image processing blocks in FIG. 3 may correspond to physical image processing components or to logical blocks or portions of circuitry that have image processing functionality and may be formed as a part of image sensor 14 (e.g., on control circuitry 17) and/or as a part of storage and processing circuitry 16. Analog to digital converter (ADC) 200 may receive analog signals from an analog source. As an example, ADC 200 may receive analog signals from an image pixel or a row of image pixels from array 15, during readout of image pixel data 101 in a given readout frame 100. ADC 200 may also receive analog signals from row noise correction columns 106, optically dark columns 107, test columns 105, and analog test rows 104. ADC 200 may convert analog signals into digital values. ADC 200 may be coupled to a test pattern generator (TPG) 197, sometimes referred to herein as first TPG 197.

First TPG 197 may receive analog pixel signals from column readout circuitry in control circuitry 17 of FIG. 1. First TPG 197 may generate test patterns that are provided as input signals to ADC 200 (e.g., test patterns that test the proper functioning ADC 200). First TPG 197 may be used to produce test patterns for analog test rows 104. First TPG 197 may have analog test pattern generating capabilities. First TPG 197 may also generate test patterns that are provided to column memories in ADC 200.

First TPG 197 may be controlled by control signals 198A and by an enable signal 198B (e.g., provided by control circuitry 17 of FIG. 1 or any other desired control circuitry). When the enable signal 198B is de-asserted, first TPG 197 may simply act as a pass through component and first TPG 197 may output signals that provided by column readout circuitry in control circuitry 17 of FIG. 1 to ADC 200. If desired, the output of first TPG 197 may be the output of a multiplexer circuit in first TPG 197 that is controlled by the enable signal 198B to output the input of first TPG 197 (analog pixel signals from column readout circuitry in control circuitry 17 of FIG. 1), when the enable signal 198B is deasserted, and to output a generated test pattern when the enable signal 198B is asserted. As an example, the output of first TPG 197 may be a multi-bit value. Multi-bit control signal 198A may include bits that specify which of the bits of the multi-bit output of first TPG 197 will correspond to a generated test pattern. Output bits of first TPG 197 that are not specified to correspond to a generated test pattern may pass through respective input bits received by test pattern generator 201.

In an embodiment of the present invention, first TPG 197 may be enabled during the readout of digital test rows 102 either before the readout of image pixel data 101 (illustrated by region 102A in FIG. 2), after the readout of image pixel data 101 (illustrated by region 102B in FIG. 2), during the readout of image pixel data 101, or both before and after the readout of image pixel data 101. First TPG 197 does not require an input from ADC 200 to generate a test pattern. Data generated by first TPG 197 during the readout period for digital test rows 102 may be processed by the same image processing blocks that process image pixel data 101. The test pattern generated by first TPG 197 may be determined in part by the portion of readout frame 100 that is being read out at a given time. The test pattern generated by first TPG 197 may be based on the multi-bit control signal 198A received by first TPG 197.

Test pattern generator (TPG) 201, sometimes referred to herein as second TPG 201, may receive digital signals from ADC 200. Second TPG 201 may be controlled by control signals 202A and by an enable signal 202B (e.g., provided by control circuitry 17 of FIG. 1 or any other desired control circuitry). When the enable signal 202B is de-asserted, second TPG 201 may simply act as a pass through component and second TPG 201 may output the same signals that were input from ADC 200 (e.g., the readout digital values may bypass second TPG 201). If desired, the output of second TPG 201 may be the output of a multiplexer circuit in second TPG 201 that is controlled by the enable signal 202B to output the input of second TPG 201 when the enable signal 202B is deasserted and to output a generated test pattern when the enable signal 202B is asserted. As an example, the output of second TPG 201 may be a multi-bit value. Multi-bit control signal 202A may include bits that specify which of the bits of the multi-bit output of second TPG 201 will correspond to a generated test pattern. Output bits of second TPG 201 that are not specified to correspond to a generated test pattern may pass through respective input bits received by test pattern generator 201.

In an embodiment of the present invention, second TPG 201 may be enabled during the readout of digital test rows 102 either before the readout of image pixel data 101 (illustrated by region 102A in FIG. 2), after the readout of image pixel data 101 (illustrated by region 102B in FIG. 2), or both before and after the readout of image pixel data 101. Second TPG 201 may also be enabled during readout of image pixel or pixel test data 101. In other words, second TPG 201 may generate test patterns during readout of image pixel or pixel test data 101, in addition to generating test patterns before and/or after readout of image pixel or pixel test data 101. Second TPG 201 does not require an input from ADC 200 to generate a test pattern. Data generated by second TPG 201 during the readout period for digital test rows 102 may be processed by the same image processing blocks that process image pixel data 101. The test pattern generated by second TPG 201 may be determined in part by the portion of readout frame 100 that is being read out at a given time. The test pattern generated by second TPG 201 may be based on the multi-bit control signal 202A received by second TPG 201.

Patterns generated by second TPG 201 during the readout period of digital test rows 102 may first proceed to a first Automotive Safety Integrity Level (ASIL) check block 203. First ASIL check block 203 may be controlled by a multi-bit control signal 204A (e.g., provided by control circuitry 17) that may calibrate first ASIL check block 203. An enable control signal 204B may be deasserted (e.g., by control circuitry 17) to configure first ASIL check block 203 to act as a pass through component and produce an output that is the same as its input. When enable control signal 204B is asserted, data input to first ASIL check block 203 may be checked according to a first ASIL standard. The failure of the data input to first ASIL check block 203 to meet the first ASIL standard may result in a halt of image capture operations, the assertion of an error flag or error notification to the system 900, or both. The failure of image pixel or digital test row data to pass the first ASIL standard in first ASIL check block 203 may be recorded in embedded data rows 103.

First ASIL check block 203 may be enabled during readout of analog test rows 104, image pixel data 101, any region of readout frame 100, or any combination of regions of readout frame 100.

The output generated by first ASIL check block 203 during the readout period of digital test rows 102 may then proceed to a plurality of image processing blocks 205. The image processing blocks 205 may receive a multi-bit enable signal 206B where each bit of the multi-bit enable signal 206B corresponds to an enable signal for a respective image processing block of the image processing blocks 205. When a given bit in the multi-bit enable signal 206B is de-asserted, a corresponding image processing block in the image processing blocks 205 may be disabled. When an image processing block is the image processing blocks 205 is disabled, it may act as a pass through component and produce an output that is the same as its input. Image processing blocks 205 may receive a multi-bit control signal 206A from control circuitry 17. Each image processing block is image processing blocks 205 may receive control data from a respective portion of the multi-bit control signal 206A.

Image processing blocks 205 may include image processing blocks that process or account for row noise correction; this image processing block may be enabled during readout of row noise correction columns 106, image pixel data 101, any region of readout frame 100, or any combination of regions of readout frame 100. Image processing blocks 205 may include image processing blocks that determine, influence, or account for automatic color gain selection; this image processing block may be enabled during readout of image pixel data 101, any region of readout frame 100, or any combination of regions of readout frame 100. Image processing blocks 205 may include image processing blocks that correct automatic color gains and offsets; this image processing block may be enabled during readout of image pixel data 101, any region of readout frame 100, or any combination of regions of readout frame 100. Image processing blocks 205 may include a FDOC mode tracker; this image processing block may be enabled during readout of row noise correction columns 106, image pixel data 101, any region of readout frame 100, or any combination of regions of readout frame 100.

The output of the enabled blocks in image processing blocks 205 during the readout period of digital test rows 102 may then proceed to a second ASIL check block 207. Second ASIL check block 207 may be controlled by a multi-bit control signal 208A that may calibrate second ASIL check block 207. An enable control signal 208B may be deasserted by control circuitry 17 to configure second ASIL check block 207 to act as a pass through component and produce an output that is the same as its input. When enable control signal 208B is asserted, the data input to second ASIL check block 207 may be checked according to a second ASIL standard. The failure of the data input to second ASIL check block 207 to meet the second ASIL standard may result in a halt of image capture operations, the assertion of an error flag or error notification to the system 900, or both. The failure of image pixel or digital test row data to pass the second ASIL standard in second ASIL check block 207 may be recorded in embedded data rows 103. First ASIL check block 203 may be enabled during readout of analog test rows 104, image pixel data 101, any region of readout frame 100, or any combination of regions of readout frame 100.

Additional image processing blocks 209 may receive data output by second ASIL check block 207. These additional image processing blocks may be enabled during readout of image pixel data 101, any region of readout frame 100, or any combination of regions of readout frame 100. Image processing blocks included in additional image processing blocks 209 may include a positive noise pedestal adjustment block, a delay block, a compression block, an expansion block, a negative noise pedestal adjustment block, a pre-HDR gain block, a DLO2 block, a dig gain and pedestal block, and a 1D defect correction block, for example.

In general, due to the presence of enable lines on all the image processing blocks of FIG. 3, data produced by ADC 200 or TPG 201 may be passed through any subset of the image processing blocks of FIG. 3 by asserting enable lines corresponding to the known subset of image processing blocks of FIG. 3 and de-asserting enable lines corresponding to the remaining image processing blocks of FIG. 3.

The output of either the second ASIL check block 207 or the additional image processing blocks may then proceed to checksum generator 211. Checksum generator 211 may generate an ODP checksum. Checksum generator 211 may generate a checksum for the data output from additional image processing blocks or second ASIL check block 207. Checksum generator 211 may contain volatile or non-volatile memory elements that store checksums corresponding to expected outputs corresponding to known test patterns that have passed through a known subset of image processing blocks in the processing blocks of FIG. 3.

Checksum generator 211 may output an error flag if the checksum it generates for the received data corresponding to a known test pattern that has passed through a known subset of image processing blocks in the processing blocks of FIG. 3 does not match the stored checksum for the expected data corresponding to the known test pattern that has passed through the known subset of image processing blocks in the processing blocks of FIG. 3. Additionally or alternatively, checksum generator 211 may notify the user of system 900 (FIG. 1) to the discrepancy between the generated checksum and the expected checksum.

Embedded data output circuitry 213 may be provided at the end of the data path illustrated in FIG. 3. Embedded data output circuitry 213 may include memory elements for storing embedded data and/or statistics for a given readout frame, a previous readout frame, or a plurality of readout frames. Embedded data output circuitry 213 may be used to output information about the operating settings of imaging system-on-chip 10, or system 900 of FIG. 1. Embedded data output circuitry 213 may be used to output the results of any of the processing, check, and/or test blocks illustrated in FIG. 3. Embedded data output circuitry 213 may be used to output image statistics taught to be included in embedded rows 103 in FIG. 2. Embedded data output circuitry 213 may be used to output information that describes the frame being read out by including values stored at various registers, such as those in control circuitry 17 that correspond to the settings and parameters used to operate the image sensor 14. Embedded data output circuitry 213 be used to output data that does not correspond directly to any register settings, but that is derived from various operating or performance metrics of the imaging system that describe factors that could influence the quality or characteristics of a given readout frame 100. Embedded data output circuitry 213 may be used to output status flags related to the imaging system-on-chip 10, including flags produced by checksum generator 211.

Figure 4:
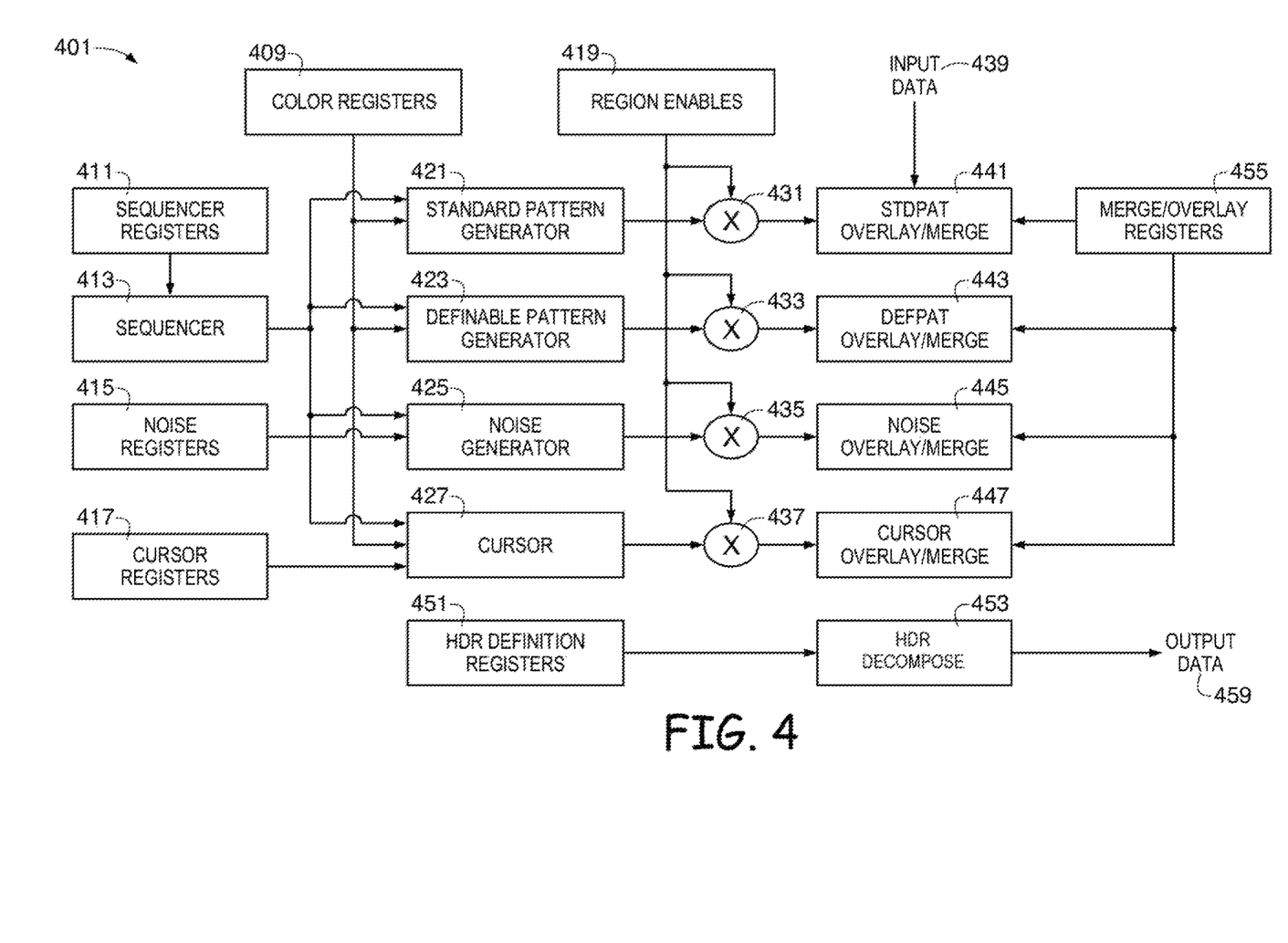
FIG. 4 is a diagram of illustrative components that may be used in generating a test pattern for performing real-time image sensor verification operations in accordance with an embodiment of the present invention.

FIG. 4 illustrates components that may be used to generate a digital test pattern. Components in FIG. 4 may be implemented in first TPG 197 and/or second TPG 201 of FIG. 3 and used to generate a test pattern when portions of readout frame 100 (FIG. 1) are being read out. Test pattern generator 401 may include registers such as color register 409, sequencer registers 411, noise registers 415, and cursor registers 417. Color registers 409 may store color values or color patterns that may be used by standard pattern generator 421, definable pattern generator 423, and cursor generator 427. Color registers 409 may provide two sets of values for foreground color values or patterns and background color values or patterns.

Sequencer registers 411 may store sequencer values used by sequencer 413, which sequences or controls the standard pattern generator 421, definable pattern generator 423, noise generator 425, and cursor generator 427. Sequencer 413 may determine which of generators 421, 423, 425, and 427 are enabled at a given time. Sequencer 411 may allow rotation between different modes of test pattern generator 401, and may disable a selected subset of generators 421, 423, 425, and 427 based a current mode of the test pattern generator 401. The mode of the test pattern generator 401 may be set in the sequencer registers 411. Standard pattern generator 421 may generate patterns based on input from sequencer 413 and values in color registers 409. Standard pattern generator 421 may, for example, generate color bars, color gradients, black and white gradients, horizontal gradients, diagonal gradients, and generally any type of test pattern that can be used to verify or test the performance of any of the image processing blocks of FIG. 3.

Definable pattern generator 423 may generate preset patterns that may correspond to symbols or shapes to test the functionality of image processing blocks in FIG. 3. As an example, definable pattern generator 423 may generate a cartoon of a simple stop sign, a yield sign, any road sign, and generally any definable pattern that can be used to test the performance of any of the image processing blocks of FIG. 3.

Noise generator 425 may be generate various types of noise. If test pattern data is read out in place of row noise correction columns 106, by enabling TPG 201 during readout of row noise correction columns 106, as an example, then noise generator 425 may produce noise patterns that correspond to row noise patterns. Similarly, noise generator 425 may produce noise patterns that correspond to column noise patterns. Multiple noise types such as row noise, column noise, area noise, fixed pattern noise, pseudo-random noise, random noise, and generally any type of noise can be generated by noise generator 425. Noise generator 425 may be configurable by values defined in noise registers 415. Noise generator 425 may be reset every frame to ensure that the noise patterns it produces enable stable checksums at checksum generator 211 of FIG. 3. Noise generator 425 may stimulate digital accumulators in the image processing blocks of FIG. 3.

Cursor generator 427 may generate a cursor such as a point, horizontal line, vertical line, or rectangle based on values in color registers 409 or cursor registers 417.

Accumulators 431, 433, 435, and 437 may receive input from generators 421, 423, 425, and 427, respectfully. Multiple generated patterns output from generators 421, 423, 425, and 427 may be input to accumulators 431, 433, 435, and 437, respectively, where they may be successively added or accumulated. Alternatively, accumulators 431, 433, 435, and 437 may receive a single input from generators 421, 423, 425, and 427, and merely act as buffers. Region enable registers 419 may enable accumulators 431, 433, 435, and 437 to output data to overlay/merge blocks 441, 443, 445, and 447 respectively. In certain embodiments of the present invention, accumulators 431, 433, 435, and 437, may simply act as gated buffers, and accumulation functionality may be implemented in overlay/merge blocks 441, 443, 445, and 447.

Standard pattern overlay/merge block 441 may overlay and/or merge data from standard pattern generator 421 that is received through accumulator 431 with input data 439 to produce an output. The output of standard pattern overlay/merge block 441 may be received by definable pattern overlay/merge block 443. Definable pattern overlay/merge block 443 may overlay and/or merge the output of standard overlay/merge block 441 with data from noise generator 425 received through accumulator 433 to produce an output.

The output of definable pattern overlay/merge block 443 may be received by noise pattern overlay/merge block 445. Noise pattern overlay/merge block 445 may overlay and/or merge the output of definable pattern overlay/merge block 443 with data from noise generator 425 received through accumulator 435 to produce an output. The output of noise pattern overlay/merge block 445 may be received by cursor overlay/merge block 447. Cursor overlay/merge block 447 may overlay and/or merge the output of noise pattern overlay/merge block 445 with data from cursor generator 427 received through accumulator 437 to produce an output. The overlay and/or merge configuration or settings of overlay/merge blocks 441, 443, 445, and 447 may be defined in merge/overlay registers 455.

HDR decompose block 453 may receive the output of cursor overlay/merge block 447, and perform HDR decomposition operations on the output of cursor overlay/merge block 447. Settings for the HDR decompose operation performed in HDR decompose block 453 may be defined in HDR definition registers 451. HDR decompose block 453 may act as a pass through component, if a corresponding setting is loaded in the HDR definition registers 451. HDR decompose block 453 may produce output data 459.

Figure 5:
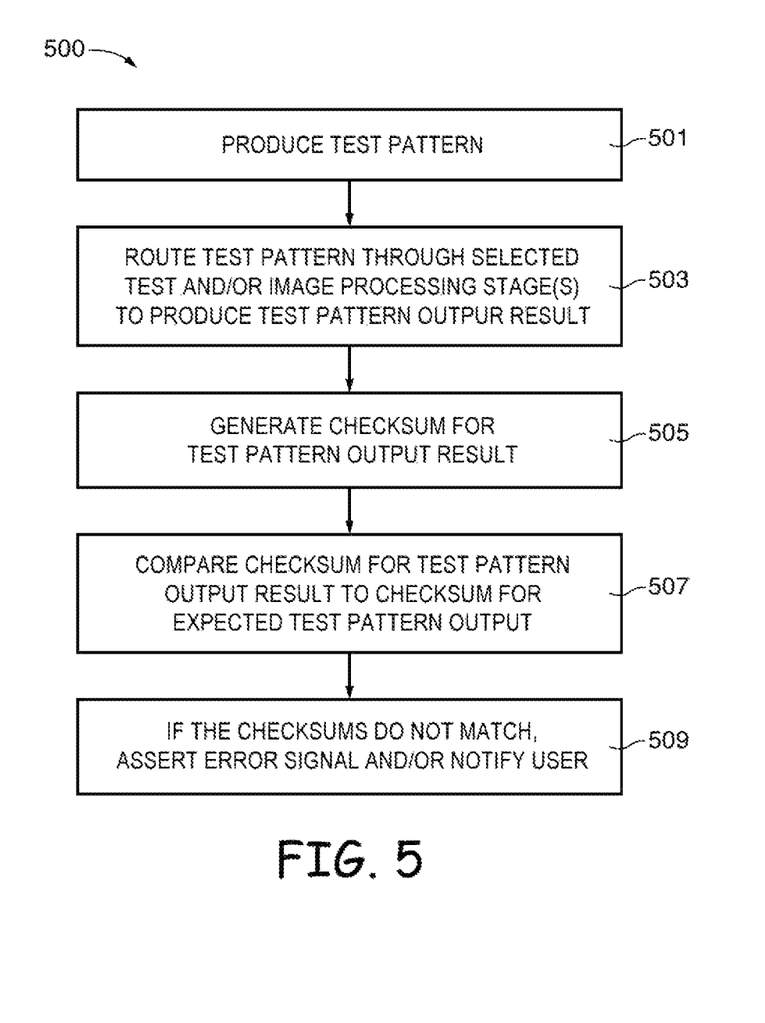
FIG. 5 is a flowchart of illustrative steps that may be performed by an image sensor in performing real-time digital testing of image processing blocks of the type shown in FIG. 3 in accordance with an embodiment of the present invention.

FIG. 5 is a flowchart of illustrative steps that may performed by storage and processing circuitry 16 to test and/or verify the functionality image processing blocks such as those illustrated in FIG. 3. While the method 500 of FIG. 5 may be used during the readout of digital test rows 102 in readout frame 100, the method may additionally be used during the readout of any region of readout frame 100.

At step 501, TPG 201 may generate a desired test pattern. The type of test pattern produced may depend on the mode of a test pattern generator 201 (FIG. 3) or 401 (FIG. 4). As an example, if a test pattern is generated during the readout of row noise correction columns 106 data in readout frame 100, then a test pattern corresponding to only row noise without any color patterns may be generated. As another example, if a test pattern is generated during the readout of image pixel data, then a test pattern corresponding to a color pattern with row noise and area noise may be generated, if it is known/expected that image pixel data 101 read out from image pixel sensor 15 has row noise and area noise.

In this way, the test pattern produced in step 501 may be relevant to the data being read out in corresponding region of readout frame 100 at the time the test pattern is generated. An appropriate test pattern for a given region of readout frame 100 may correspond to a test pattern that has data that is similar in content to the data that would be read out from the corresponding region of readout frame 100 in normal imaging operations of system 900. An appropriate test pattern for a given region of readout frame 100 may also correspond to a test pattern that has data that will provide a relevant input signal to the subset of image processing blocks (such as those described in FIG. 3) that are used to process data from the given region of readout frame 100 during normal imaging operations of system 900.

At step 503, TPG 201 may route the test pattern through selected test and/or image processing stages to produce a test pattern output result. For example, a generated test pattern may be routed through a subset of the image processing blocks and check blocks of FIG. 3.

The routing of a test pattern through a subset of image processing blocks and check blocks can be effected by selectively asserting bits of enable signals such as enable signals 204B, 208A, and multi-bit enable signals 206A and 210A corresponding to the desired subset of image processing blocks and check blocks, and deasserting enable signals for the remaining image processing blocks and check blocks. The subset of image processing blocks and check blocks that a given test pattern is routed through may be determined by the portion of the readout frame during which the test pattern is being generated. As an example, if a given region of readout frame 100 is not processed by additional image processing blocks 209, a test pattern generated during the readout of the given region may not be processed by additional image processing blocks 209 as well. Test patterns generated during the readout of digital test rows 102 in readout frame 100 may pass through any single image processing block, any subset of the image processing blocks, or all image processing blocks and check blocks of FIG. 3. The subset of image processing blocks and check blocks that digital test row data is configured to pass through may be recorded in embedded data rows 103 (FIG. 1).

The selected test or check blocks/stages and selected image processing blocks/stages through which a given test pattern has been routed may produce an output result.

At step 505, checksum generator 211 may generate a checksum value for the output result corresponding to the given test pattern.

At step 507, checksum generator 211 may compare the checksum for the given test pattern output result to a checksum for an expected test pattern output. As described above in connection with FIG. 3, checksum generator 211 may have memory elements that store checksum values corresponding to an expected output value for a test pattern corresponding to the output value of the selected test or check blocks and image processing blocks that received the given test pattern as an input, when the check blocks and image processing blocks are properly functioning.

As an example, an expected test pattern output checksum may correspond to the output value of a properly functioning first ASIL check 203, a properly functioning first subset of image processing blocks 205, and a properly functioning second ASIL check 207 when a color bar test pattern is provided as input. In this example, a color bar test pattern may be produced while processing step 501. The generated test pattern may be routed through first ASIL check 203, a first subset of image processing blocks 205, and second ASIL check 207 to produce an output result at step 503. At step 505, a checksum of the output result may be generated. At step 507, the checksum of the output result may be compared to the expected test pattern output checksum. If the two checksums do not match, it can indicate that one of the blocks through which the test pattern was routed is not functioning properly.

At step 509, control circuitry 17 may assert an error signal and/or notify the user if the checksums do not match. In response to an output result checksum not matching an expected test pattern output checksum, circuitry 17 may assert an error flag/signal that alerts a processing controller in storage and processing circuit 16/24 (FIG. 1) or the user of system 900. Alternatively, the imaging system may enter a diagnostic mode to determine which of the image processing blocks and/or test blocks that the test pattern was routed through is not functioning properly.

Figure 6:
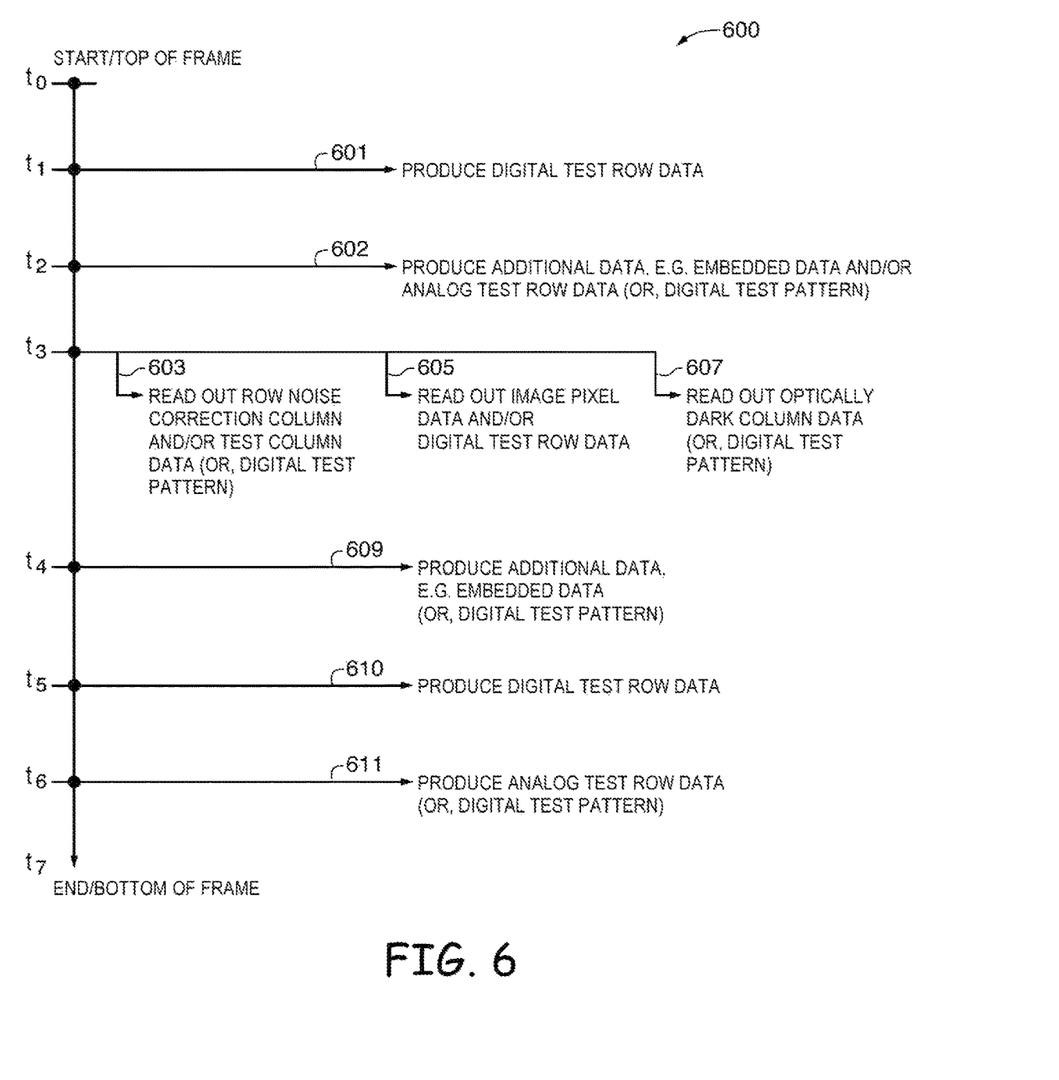
FIG. 6 is a flowchart of illustrative readouts that may occur during a frame readout while performing real-time image sensor test and verification operations in accordance with an embodiment of the present invention.

FIG. 6 illustrates the various readouts that may occur during a frame time in an imaging mode of system 900 (FIG. 1). The frame time of the frame readout 600 may be defined by the time from the start of frame to the end of frame, or $t_5$-$t_0$. From $t_0$ to $t_1$, system 900 may assign values to registers and perform other operations to prepare image sensor array 15 for image capture operation. In some embodiments of the present invention, $t_0$ may be equal to $t_1$. From $t_1$ to $t_2$, readout 601 corresponding to producing and reading out digital test row data may occur. Readout 601 may correspond to a readout of data in region 102A of readout frame 100 of FIG. 2. Data read out from digital test rows 102A may be processed in a manner similar to that described in FIG. 5. Data read out from digital test rows 102A may be processed by any single, or any subset of image processing blocks and/or test blocks in FIG. 3.

From $t_2$ to $t_3$, readout 602 may occur. Readout 602 may correspond to producing additional data such as data corresponding to rows such as embedded data (described above in connection with embedded data rows 103A of FIG. 2), and/or analog test row data (described above in connection with analog test rows 104A of FIG. 2). Data read out from embedded data rows 103A may be processed by a first subset of image processing and/or test blocks of FIG. 3. Data read out from analog test rows 104A may be processed by a second subset of image processing and/or test blocks of FIG. 3. Optionally, data readout from embedded data rows 103A and/or analog test rows 104A may forego processing from any of the image processing and/or test blocks of FIG. 3.

As described above in connection with FIG. 2, readouts 601 and 602 may occur in any order; the order illustrated in FIG. 6 is merely illustrative. As an example, in a given frame readout, between $t_1$ and $t_3$, readout 602 may occur before readout 601. Any of the row readouts 601 or 602 may be omitted from a given frame readout 600.

Readout 602 may alternatively be replaced by a readout and processing of digital test patterns that are appropriate to the embedded data rows 103A and/or analog test rows 104A, as described above in connection with step 501 of FIG. 5. Replacing readout 611 with a readout and processing of test patterns may correspond to using first TPG 197 to produce test patterns at the input of ADC 200 of FIG. 3, or loading values into the column memories of ADC 200. If readout 602 is replaced by a readout of digital test patterns, then the readout of patterns appropriate to embedded data rows 103 may be processed by the aforementioned first subset of image processing and/or test blocks of FIG. 3, and the readout of patterns appropriate to analog test rows may be processed by the aforementioned second subset of image processing and/or test blocks of FIG. 3.

From $t_3$ to $t_4$, readouts 603, 605, and 607 may occur. Readout 603 may correspond to reading out row noise correction column data such as data in region 106 of readout frame 100 and/or test column data such as data in region 105 of readout frame 100. Data read out from row noise correction columns 106 may be processed by a third subset of image processing and/or test blocks of FIG. 3. Data read out from test columns 105 may be processed by a fourth subset of image processing and/or test blocks of FIG. 3. Readout 603 may alternatively be replaced by a readout and processing of digital test patterns that are appropriate to the row noise correction column and/or test column data, as described above in connection with step 501 of FIG. 5. If readout 603 is replaced by a readout of digital test patterns, then the readout of patterns appropriate to row noise correction columns may be processed by the aforementioned third subset of image processing and/or test blocks of FIG. 3, and the readout of patterns appropriate to test columns 105 may be processed by the aforementioned fourth subset of image processing and/or test blocks of FIG. 3.

Readout 605 may correspond to reading out image pixel data such as data in region 101 of readout frame 100. Data read out from image pixel rows region 101 may be processed by a fifth subset of image processing and/or test blocks of FIG. 3. Readout 605 may alternatively, or additionally correspond to a readout and processing of digital test row data, corresponding to test patterns that are appropriate to the image pixel data, as described above in connection with step 501 of FIG. 5. If readout 605 is replaced by a readout of digital test row data, then the readout of patterns appropriate to image pixel data 101 (associated with digital test row data) may be processed by the aforementioned fifth subset of image processing and/or test blocks of FIG. 3.

Readout 607 may correspond to reading out optically dark column data such as data in region 107 of readout frame 100. Data read out from optically dark column region 107 may be processed by a sixth subset of image processing and/or test blocks of FIG. 3. Readout 607 may alternatively be replaced by a readout and processing of digital test patterns that are appropriate to the optically dark columns, as described above in connection with step 501 of FIG. 5. If readout 607 is replaced by a readout of digital test patterns, then the readout of patterns appropriate to optically dark columns 107 may be processed by the aforementioned sixth subset of image processing and/or test blocks of FIG. 3.

The spatial layout of readouts in FIG. 6 is merely illustrative. Readouts 603 and 606 may correspond to column readouts to the right of readout 605 in a readout frame, or to the left of readout 605 in a readout frame. Any of the column readouts 603 or 607 may be omitted from a given frame readout 600.

From $t_4$ to $t_5$, readout 609 corresponding to producing additional data such as data corresponding to rows such as embedded data (described above in connection with embedded data rows 103B of FIG. 2) may occur. Data read out from embedded data rows 103B may be processed by the aforementioned first subset of image processing and/or test blocks of FIG. 3, or by a seventh subset of image processing and/or test blocks of FIG. 3. Optionally, data readout from embedded data rows 103 may forego processing from any of the image processing and/or test blocks of FIG. 3.

Readout 609 may alternatively be replaced by a readout and processing of digital test patterns that are appropriate to the embedded data rows 103B, as described above in connection with step 501 of FIG. 5. If readout 609 is replaced by a readout of digital test patterns, then the readout of patterns appropriate to embedded data rows 103B may be processed by the aforementioned first or seventh subsets of image processing and/or test blocks of FIG. 3.

From $t_5$ to $t_6$, readout 610 corresponding to producing and reading out digital test row data may occur. Readout 610 may correspond to a readout of data in digital test row region 102B of readout frame 100 of FIG. 2. Data read out from digital test rows 102A may be processed in a manner similar to that described in FIG. 5. Data read out from digital test rows 102A may be processed by any single, or any subset of image processing blocks and/or test blocks in FIG. 3.

From $t_6$ to $t_7$ readout 611 may occur. Readout 611 may correspond to reading out analog test row data such as data in region 104B of readout frame 100. Data read out from analog test rows 104B may be processed by the aforementioned second subset of image processing and/or test blocks of FIG. 3, or by an eighth subset of image processing and/or test blocks of FIG. 3. Readout 611 may alternatively be replaced by a readout and processing of digital test patterns that are appropriate to the analog test rows 104B, as described above in connection with step 501 of FIG. 5. Replacing readout 611 with a readout and processing of test patterns may correspond to using first TPG 197 to produce test patterns at the input of ADC 200 of FIG. 3, or loading values into the column memories of ADC 200. If readout 611 is replaced by a readout of digital test patterns, then the readout of patterns appropriate to analog test rows 104B may be processed by the aforementioned second or eighth subset of image processing and/or test blocks of FIG. 3. The end of readout 611 may correspond to the end of frame for a given readout 600 or readout frame 100.

As described above in connection with FIG. 2, readouts 609-611 may occur in any order; the order illustrated in FIG. 6 is merely illustrative. As an example, in a given frame readout, between $t_4$ and $t_7$, readout 611 may occur before readout 609, or between readouts 609 and 611. Any of the row readouts 609-611 may be omitted from a given frame readout 600.

Figure 7:
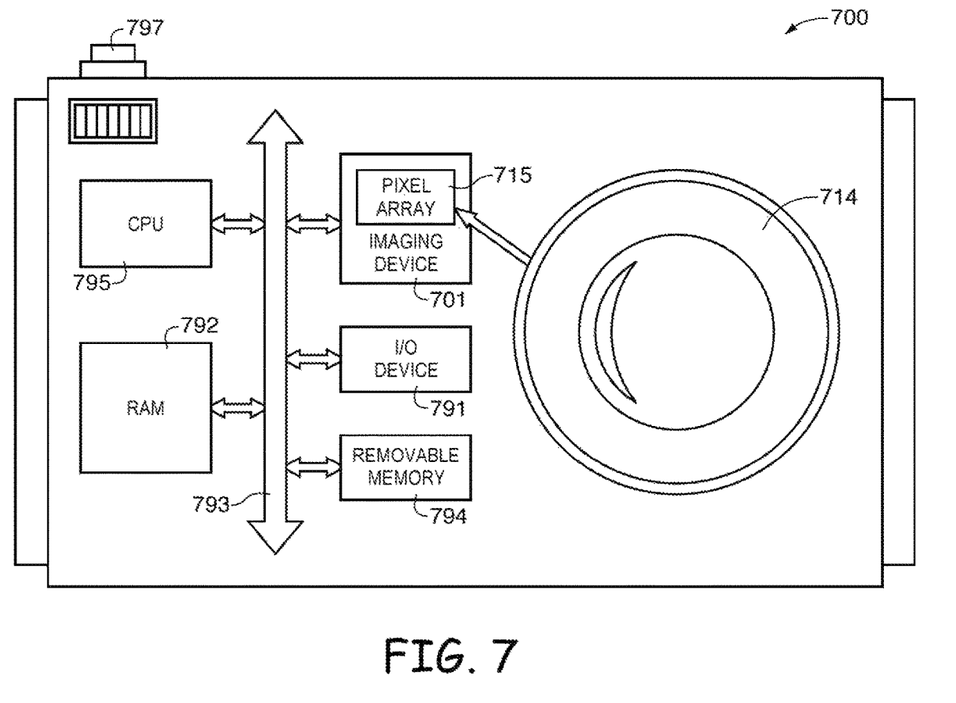
FIG. 7 is a block diagram of an imager employing one or more embodiments of FIGS. 1-6 in accordance with embodiments of the present invention.

FIG. 7 shows in simplified form a typical processor system 700, such as a digital camera, which includes an imaging device such as imaging device 701 which may be, for example a multi-camera imaging system with one or more pixel arrays 715. Device 701 may comprise the elements of system 900 (FIG. 1) or any relevant subset of the elements. Processor system 700 is exemplary of a system having digital circuits that could include imaging device 701. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

Processor system 700, which may be a digital still or video camera system, may include a lens or multiple lenses indicated by lens 714 for focusing an image onto a pixel array or multiple pixel arrays such as pixel array 715 when shutter release button 797 is pressed. Processor system 700 may include a central processing unit such as central processing unit (CPU) 795. CPU 795 may be a microprocessor that controls camera functions and one or more image flow functions and communicates with one or more input/output (I/O) devices 791 over a bus such as bus 793. Imaging device 701 may also communicate with CPU 795 over bus 793. System 700 may include random access memory (RAM) 792 and removable memory 794. Removable memory 794 may include flash memory that communicates with CPU 795 over bus 793. Imaging device 701 may be combined with CPU 795, with or without memory storage, on a single integrated circuit or on a different chip. Although bus 793 is illustrated as a single bus, it may beone or more buses or bridges or other communication paths used to interconnect the system components.

Various embodiments have been described illustrating systems with real-time imaging capabilities. Image processing circuitry may be used to produce an output data frame that includes digital test pattern data during a given frame time (e.g., during normal imaging operations of an image sensor that generates a data frame during the given frame time without operating the image sensor or the processing circuitry in a dedicated test mode). The image processing circuitry may include image processing blocks (circuits). A given subset of the image processing blocks may be configured to process image data and/or a digital test pattern. A digital test pattern that is processed using the given subset of image processing blocks may be generated based on or corresponding to a data type or the a particular data region of the data frame read out from the image sensor. Digital test patterns and data readout from an image sensor array may be checked by image checking circuitry, such as ASIL test circuitry.

In general, digital test patterns may be generated by a test pattern generators in the image sensor based on, or corresponding to, any desired region of an output frame of data, or any data read out from the image sensor array. Test pattern generators may also be used to produce patterns that are provided to the ADC in a readout data path. Readout from an image sensor array to generate data in a first region of an output data frame may be followed by processing the first region data using a first subset of image processing blocks. Alternatively or additionally, a test pattern corresponding to or based on the first region may be generated and processed by the first subset of image processing blocks.

A first test pattern that has been processed by the first subset of image processing blocks may be used to indicate whether or not the image processing blocks in the first subset of image processing blocks is functioning properly, by generating a checksum of the processed test pattern. The checksum of the processed test pattern may be compared to a predetermined checksum. The predetermined checksum may be the checksum of the output of the first image processing blocks that are verified to be properly operating, when provided a test pattern that is identical or similar to the first test pattern. When the checksum of the processed test pattern does not match the predetermined checksum, an error signal may be asserted. A given test pattern may be processed by only one, only two, or any number of image processing blocks.

Test patterns may be generated to verify the proper functioning of image processing blocks and more generally an imaging system, before, after, or before and after the imaging system captures and processes image pixel data. Proper functioning of image processing blocks may also be tested by digital test circuitry. Proper functioning of image processing blocks may be tested once per frame time, twice per frame time, or any number of times per frame time.

The foregoing is merely illustrative of the principles of this invention and various modifications can be made by those skilled in the art without departing from the scope and spirit of the invention. The foregoing embodiments may be implemented individually or in any combination.

What is claimed is:

1. Image processing circuitry that produces an output data frame during a frame time interval, comprising:
   control circuitry coupled to an image sensor, wherein the image sensor comprises a plurality of pixels arranged in rows and columns, wherein the control circuitry is configured to output test data during a first portion of the frame time interval of a first checking operation and pixel data during a second portion of the frame time interval of the first checking operation that is subsequent to the first portion;
   a plurality of image processing blocks that are configured to process the test data and the pixel data output by the control circuitry, wherein the plurality of image processing blocks comprises:
      a first subset of image processing blocks that is configured to process only the test data; and
      a second subset of image processing blocks that is configured to process only the pixel data, wherein the control circuitry is configured to bypass a selected subset of the plurality of image processing blocks, and wherein the image processing circuitry further comprises:
         a test pattern generator that is configured to output test patterns to the plurality of image processing blocks during the second portion of the frame time interval of a second checking operation, the second checking operation different from the first checking operation, wherein the test pattern generator is configured to output test patterns corresponding to the pixel data during at least part of the second portion of the frame time interval of the second checking operation, wherein the test pattern generator is further configured to output test patterns corresponding to digital test data during the entire first portion of the frame time interval of the second checking operation, and wherein the second subset of image processing blocks are configured to process the test patterns based on the pixel data to produce a processed test value.

2. The image processing circuitry defined in claim 1, further comprising:
   a checksum generator, wherein the checksum generator is configured to generate a checksum value based on the processed test value, to compare the generated checksum value to a predetermined checksum value, and to assert an error signal when the generated checksum value is different from the predetermined checksum value.

3. The image processing circuitry defined in claim 2, wherein the test pattern generator is configured to output test patterns corresponding to the test data during at least a part of the first portion of the frame time interval, wherein the first subset of image processing blocks are configured to process the test patterns based on the test data to produce an additional processed test value, and wherein the checksum is further configured to generate a checksum based on the processed test value and the additional processed test value.

4. The image processing circuitry defined in claim 1, wherein the test pattern generator is configured to output test patterns corresponding to the pixel data during the entire second portion of the frame time interval.

5. The image processing circuitry defined in claim 1, wherein the digital test pattern generator comprises:
a plurality of pattern generator blocks, comprising:
a standard pattern generator;
a definable pattern generator;
a noise generator; and
a cursor generator; and
a region enable register that selectively includes respective outputs of the plurality of pattern generator blocks in the generated digital test pattern.

6. The image processing circuitry defined in claim 5, wherein the region enable register is configured to include outputs of a first subset of the plurality of pattern generator blocks into the generated digital test pattern so that the generated digital test pattern corresponds to a first data type associated with a first region data generated by the image sensor pixel array, and wherein the region enable register is configured to include outputs of a second subset of the plurality of pattern generator blocks into the generated digital test pattern so that the generated digital test pattern corresponds to a second data type associated with a second region data generated by the image sensor pixel array.

7. The image processing circuitry defined in claim 5, wherein the digital test pattern generator is configured to generate the digital test pattern by overlaying the outputs of the plurality of pattern generator blocks that are selectively included in the generated digital test pattern by the region enable register.

8. A method of operating an imaging system during a frame time interval that is the inverse of an operating frame rate of the imaging system, wherein the imaging system comprises an array of image sensor pixels, test pattern generator circuitry, image processing circuits, and pixel readout circuitry, the method comprising:
with the test pattern generator circuitry, generating a digital test pattern based on a frame of data generated by the array;
after generating the digital test pattern, with data checking circuitry, performing first Automotive Safety Integrity Level (ASIL) checking operations on the digital test pattern;
after performing the first Automotive Safety Integrity Level (ASIL) checking operations on the digital test pattern, with a first subset of the image processing circuits, processing the digital test pattern to produce a test output value;
with the pixel readout circuitry, reading out image signals from the pixel array to produce image pixel data;
after reading out the image signals, with the data checking circuitry, performing second Automotive Safety Integrity Level (ASIL) checking operations on the image pixel data; and
after performing the second Automotive Safety Integrity Level (ASIL) checking operations on the image pixel data, with a second subset of the image processing circuits, processing the image pixel data to produce processed image pixel data.

9. The method defined in claim 8, wherein the frame of data comprises at least first and second regions, wherein the first and second regions are associated with first and second data types respectively, wherein the image data is of the first data type, and wherein generating the digital test pattern comprises:
generating a digital test pattern corresponding to a given data type, wherein the first subset is the same as the second subset when the given data type is the first data type, and wherein the first subset is different than the second subset when the given data type is the second data type.

10. The method defined in claim 8, further comprising:
with checksum circuitry, generating a test result checksum value based on the test output value.

11. The method defined in claim 10, further comprising:
with the checksum circuitry, comparing the test result checksum value to an expected test checksum value; and
with the checksum circuitry, asserting an error signal when the test result checksum value is different from the expected test checksum value.

12. The method defined in claim 8, wherein reading out pixel signals from the pixel array comprises reading out at least one signal selected from the group of signals consisting of: row noise correction pixel signals and optically dark pixel signals.

13. The method defined in claim 8, wherein the frame of data comprises at least first and second regions, wherein the first and second regions are associated with first and second data types respectively, and wherein the digital test pattern corresponds to the first data type, the method further comprising:
with the test pattern generator circuitry, generating an additional digital test pattern, wherein the additional digital test pattern is based on the second data type; and
with a third subset of the image processing circuits, processing the additional digital test pattern to produce an additional test output value.

14. The method defined in claim 8, the method further comprising:
with additional data checking circuitry, performing third ASIL checking operations on the processed image pixel data; and
with the additional data checking circuitry, performing fourth ASIL checking operations on the test output value.

15. Image processing circuitry that produces an output data frame during a frame time interval, comprising:
control circuitry coupled to an image sensor, wherein the image sensor comprises a plurality of pixels arranged in rows and columns, wherein the control circuitry is configured to output digital test data during a first portion of the frame time interval of a first checking operation and pixel data during a second portion of the frame time interval of the first checking operation that is subsequent to the first portion;
a plurality of image processing blocks that are configured to process the digital test data and the pixel data output by the control circuitry, wherein the plurality of image processing blocks comprises:
a first subset of image processing blocks that is configured to process the digital test data; and
a second subset of image processing blocks that is configured to process the pixel data, wherein the control circuitry is configured to bypass a selected subset of the plurality of image processing blocks, and wherein the image processing circuitry further comprises:
a test pattern generator that is configured to output test patterns to the plurality of image processing blocks during the second portion of the frame time interval of a second checking operation, the second checking operation different from the first checking operation, wherein the test pattern generator is configured to output test patterns corresponding to the pixel data during at least part of the second portion of the frame time interval of the second checking operation, wherein the test pattern generator is further configured to output test patterns corresponding to digital test data during the entire first portion of the frame time interval of the second checking operation, and wherein the second subset of image processing blocks are configured to process the test patterns based on the pixel data to produce a processed test value.

* * * * *